(12) United States Patent
Deeter et al.

(10) Patent No.: US 9,491,251 B2
(45) Date of Patent: Nov. 8, 2016

(54) TRANSMISSION OF NOTIFICATIONS TO MULTIPLE DEVICES ASSOCIATED WITH A USER

(71) Applicant: Facebook, Inc., Menlo Park, CA (US)

(72) Inventors: Ken Deeter, San Francisco, CA (US); Wayne Kao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 64 days.

(21) Appl. No.: 13/686,040

(22) Filed: Nov. 27, 2012

(65) Prior Publication Data

US 2014/0149538 A1    May 29, 2014

(51) Int. Cl.
  *G06F 15/16* (2006.01)
  *H04L 29/08* (2006.01)
  *H04L 12/58* (2006.01)

(52) U.S. Cl.
  CPC ............ *H04L 67/26* (2013.01); *H04L 51/24* (2013.01); *H04L 51/14* (2013.01); *H04L 51/30* (2013.01)

(58) Field of Classification Search
  CPC .. H04L 67/26; H04L 29/06; H04L 29/08072
  USPC ........ 709/206, 204, 207, 217, 219, 223, 224
  See application file for complete search history.

(56) References Cited

U.S. PATENT DOCUMENTS

| | | | |
|---|---|---|---|
| 6,854,012 B1 * | 2/2005 | Taylor | 709/224 |
| 7,308,617 B2 | 12/2007 | Artobello et al. | |
| 7,483,525 B2 * | 1/2009 | Chaddha et al. | 379/142.07 |
| 7,496,630 B2 * | 2/2009 | Arellano et al. | 709/206 |
| 7,647,202 B2 | 1/2010 | Lamontagne | |
| 7,657,594 B2 * | 2/2010 | Banga et al. | 709/203 |
| 7,853,662 B2 | 12/2010 | Ha et al. | |
| 8,635,339 B2 * | 1/2014 | Luna | 709/224 |
| 2006/0135204 A1 * | 6/2006 | Angelhag | 455/557 |
| 2008/0031436 A1 | 2/2008 | Der et al. | |
| 2009/0077045 A1 | 3/2009 | Kirchmeier et al. | |
| 2012/0198185 A1 | 8/2012 | Aoki | |
| 2013/0325922 A1 * | 12/2013 | Chaudhri et al. | 709/203 |
| 2014/0067982 A1 * | 3/2014 | Albouyeh et al. | 709/207 |

FOREIGN PATENT DOCUMENTS

| | | | |
|---|---|---|---|
| EP | 1 280 314 A2 | 1/2003 | |
| EP | 2 249 517 A1 | 11/2010 | |

OTHER PUBLICATIONS

Litonjua, Cyril Vance. "Quartiles, Deciles and Percentiles." Quartiles, Deciles and Percentiles. Blogger, Mar. 23, 2012. Web. Jan. 21, 2016. <http://quartilesdecilespercentiles.blogspot.com/>.*
European Patent Office, Search Report and Opinion, European Patent Application No. 13192638.8, Feb. 28, 2014, six pages.
PCT International Search Report and Written Opinion, PCT Application No. PCT/US2013/069842, Feb. 28, 2014, eleven pages.

* cited by examiner

*Primary Examiner* — Liangche A Wang
*Assistant Examiner* — Kaylee Huang
(74) *Attorney, Agent, or Firm* — Fenwick & West LLP

(57) ABSTRACT

A notification system provides notifications to a user associated with multiple user devices. The notification system selects a user device to receive a notification based on user behavior, such as user interactions with the notification system via the user device or acknowledgments of notifications received from user devices. The notification is sent to the selected user device, and the notification system waits for an acknowledgment from the selected notification system for an acknowledgement delay period. If no acknowledgment is received within the acknowledgment delay period, an additional user device is selected and the notification is sent to the additional user device.

26 Claims, 3 Drawing Sheets

TRANSMISSION OF NOTIFICATIONS TO MULTIPLE DEVICES ASSOCIATED WITH A USER

BACKGROUND

This invention relates generally to event notifications in online systems, and more particularly to providing notifications to multiple user devices associated with an online system user.

Many online systems include a notification system to notify users of the online system when events occur. For example, when a user of a social networking system receives a message or is identified in a post, a notification system of the social networking system transmits a notification of the event to the user. Notifications may be sent to multiple devices associated with a user. Hence, when a user accesses the online system using a single user device, the single user device receives the notification. But when users access the online system using multiple user devices, all of the user devices are typically notified of a generated notification at approximately the same time. This results in notifications being sent to user devices that may not be used by the user. Additionally, the user must acknowledge or remove the notification from each user device individually, causing the user to repetitively view notifications for the same event on multiple user devices.

SUMMARY

A notifications system notifies a user of an event by transmitting notifications of the event to different user devices with a time delay separating transmission of the notification to different user devices. The notification system identifies a plurality of user devices associated with the user that are eligible for receiving notifications. For example, a user device is eligible to receive a notification if a notification has not previously been transmitted to the user device within a threshold time. A user device is selected from the plurality of user devices eligible to receive the notification. For example, the notification system selects a user device based on recent user activity with various user devices and prior responses by the user to notifications transmitted to various user devices. A notification is provided to the selected user device, and the notification system waits an acknowledgement delay period to receive an acknowledgement of the notification from the selected user device. If the user device does not provide an acknowledgment by the expiration of the acknowledgement delay period, the notification system selects an additional user device from the plurality of user devices eligible for receiving notifications and waits an additional acknowledgement delay period to receive an acknowledgement of the notification from the selected additional user device. In some embodiments, the acknowledgement delay period may vary depending on the device to which the notification is transmitted.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
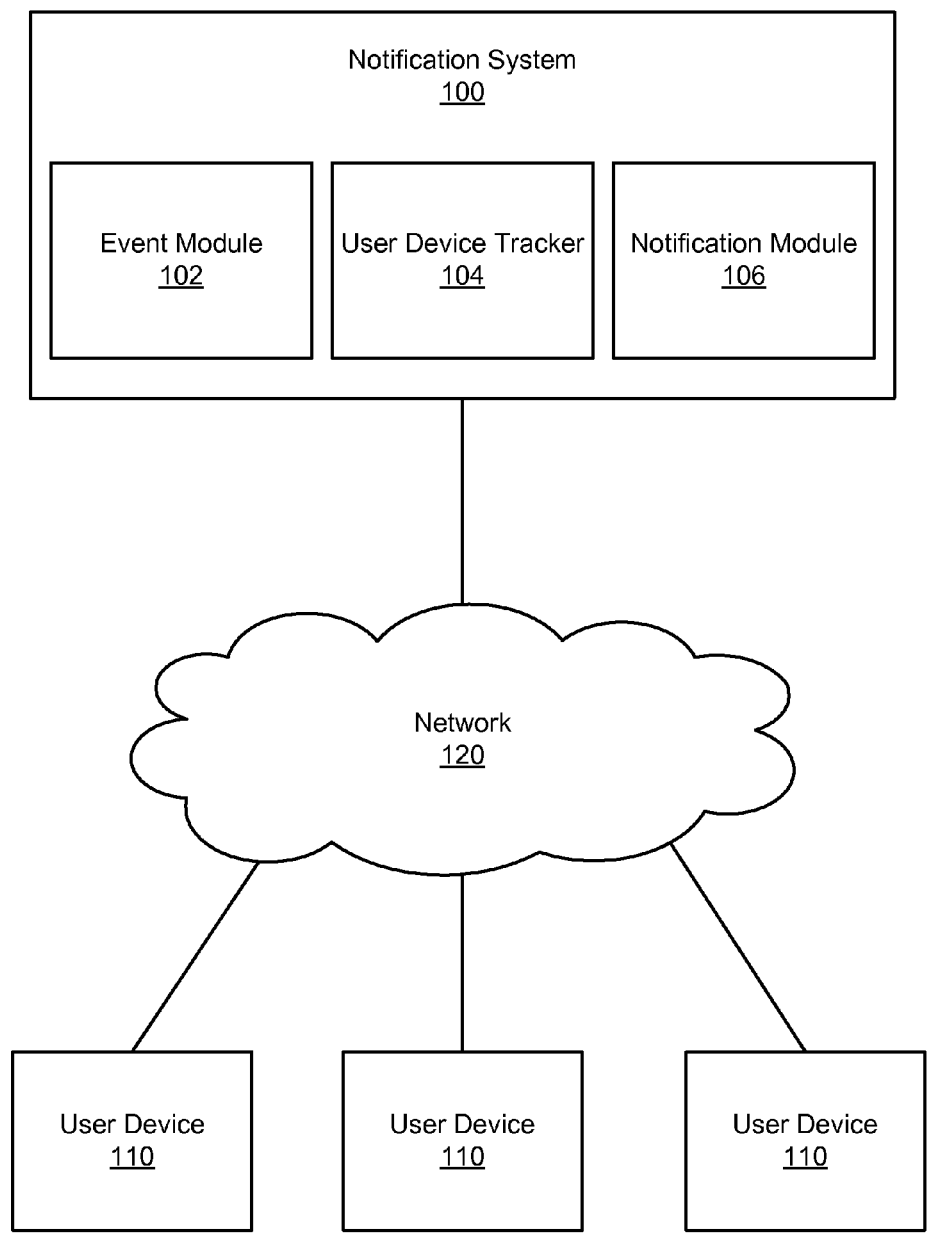
FIG. 1 is a block diagram of a system environment including a notification system according to one embodiment.

FIG. 1 is a block diagram of one embodiment of an environment including a notification system 100. The environment includes the notification system 100, a plurality of user devices 110, and a network 120. The notification system 100 communicates with the plurality of user devices 110 through a network 120.

A user communicates with the notification system 100 using one or more of the plurality of user devices 110. Each user device 110 is associated with a particular user of the notification system 100. A user device 110 is any device capable of processing data as well as transmitting and/or receiving data via the network 120. Examples of a user device 110 include a mobile device, a tablet computer, a laptop computer, a desktop computer, a set-top box, or any other computing device.

A user device 110 receives a notification of an event from the notification system 100 via the network 120 and presents the received notification to a user of the user device 110. Different types of user devices 110 may present the notification to a user in different formats. For example, a mobile device turns on a message indicator light or displays a notification icon on a home screen of the device, while a desktop computer displays a pop-up window, plays a sound, or changes a description of an application in a task bar display. Hence, user devices 110 present a notification to a user in a manner configured to draw the user's attention to the notification.

For many user devices 110, when a notification is received the notification is presented to the user until it is viewed or cleared by the user. Hence, a user device 110 continues to draw the user's attention to a notification until the user accesses the user device to acknowledge the notification. When the user views the notification on the user device 110, an acknowledgment is communicated from the user device 110 to the notification system 100 via the network 120. The acknowledgment may be specific to the notification, or may be included in a communication to the notification system 100, such as an interaction of the user with the notification to request further information from the notification system 100. For example, a notification from a notification system 100 incorporated into a social networking system notifies a user that the user is tagged in a photo; the user interacting with the notification to access the photo may be an acknowledgement of the notification by the user. Alternatively, the user device 110 provides an acknowledgment to the notification system 100 when the user accesses the notification.

To simplify user access to notifications, the notification system 100 communicates notifications to user devices 110 in series, while conventional notification techniques communicate notifications to user devices 110 in parallel. When the notification system 100 receives an acknowledgement of a notification from a user device 110 associated with the user, the notification system 100 stops transmitting notifications to additional user devices 110 associated with the user. Thus, when a user acknowledges a notification from one user device 110, the notification is not communicated to additional user devices 110 associated with the user.

The notification system 100 selects a user device 110 associated with a user from which the user is most likely to respond to the notification and initially communicates the notification to the selected user device 110. After the selected user device receives the notification, the user is provided a period of time, also referred to as an acknowledgement delay period, to acknowledge the notification. After the acknowledgment delay period elapses, the notification system 100 communicates the notification to an additional user device 110 associated with the user.

In the embodiment shown by FIG. 1, the notification system 100 includes an event module 102, a user device tracker 104, and a notification module 106. The event module 102 identifies events for notifying to a user and communicates the identified events to the notification module 106. In one embodiment, the event module 102 generates events. Alternatively, the event module 102 receives events from another component of the notification system 100 or from an external system. For example, if the notification system 100 is part of a social networking system, the event module 102 generates or receives an event when a new post is created, when a user is tagged in a photo, or when other actions are taken in the social networking system. The event module 102 also determines whether to notify a user of a specific event. System settings and user settings determine whether a user is notified of an event or of a particular type of event. The event module 102 associates users with an event and provides the event and associated users to the notification module 106.

The user device tracker 104 maintains records of the user devices 110 eligible to receive notifications for each user and data describing user activity on user devices 110 associated with a user. User devices eligible to receive a notification for a user are user devices 110 that are associated with the user by the notification system 100 and that the user identifies as devices for receiving a notification. Additional information may be used to determine if a user device 110 is eligible to receive a notification; for example, if a user device 110 received a notification within a threshold amount of time and no acknowledgement of the notification is received, the user device 110 may be ineligible to receive notifications. In one embodiment, the user device 110 is identified as eligible or ineligible for notifications based on whether the user is logged into an account associated with the notification system 100 from the user device 110.

As a user interacts with the notification system 100 or with a system associated with the notification system 100, the user interactions are recorded by the device tracker 104. For each interaction by a user, the user device tracker 104 identifies the user device 110 from which the interaction was received and may also associate a timestamp with the received interaction. The user device activity indicates which user devices 110 have been used access the notification system 100 and to acknowledge notifications.

The notification module 106 selects a user device 110 associated with a user from the user devices associated with the user and eligible to receive notifications based on user activity stored by the user device tracker 104. The selected user device may be determined in several ways based on the user device activity. In one embodiment, the user device 110 associated with the activity having the most recent timestamp is selected. In one embodiment, the user device 110 associated with the activity having the most recent timestamp within a threshold idle time of a current time (e.g., within the past five minutes) is selected. When no user device is used within the threshold idle time, the notification module 106 may predict which of the user devices 110 is most likely to be viewed based on historical interactions associated with different user devices 110. The notification module 106 transmits the notification to the selected user device.

In one embodiment, the notification module 106 generates a profile of a user's prior interactions associated with different user devices 110. The profile may specify an order in which a user is likely to access different user devices 110. For example, the notification module 106 generates the profile using user interactions stored by the user device tracker 104 to determine a user device 110 most likely to be accessed first if user is not actively using a user device 110. For example, when available to receive notifications on three devices, after an idle time threshold, a user may be likely to interact with a user device 110 50% of the time, with another user device 110 30% of the time, and with an additional user device 110 20% of the time. Thus, the frequency of a user's interaction with different user devices 110 after the idle time threshold is used to predict the user device 110 most likely to be accessed by the user. In some embodiments, the user's frequency of interaction with user devices 110 may be determined with respect to various parameters. Examples of parameters include time of day, time differences between interactions received from various user devices 110, ordering in which interactions are received from various user devices 110. For example, many users have common schedules throughout a day and interact with different user devices 110 during different portions of their schedule. As an example, an office employee may acknowledge notifications using a desktop computer during work hours, using a mobile device during lunch, and using a tablet computer outside of work hours. Associating the user device activity 110 with times of day allows the profile to more effectively identify the user device 110 from which the user is most likely to interact with the notification.

Notification Transmission

Figure 2:
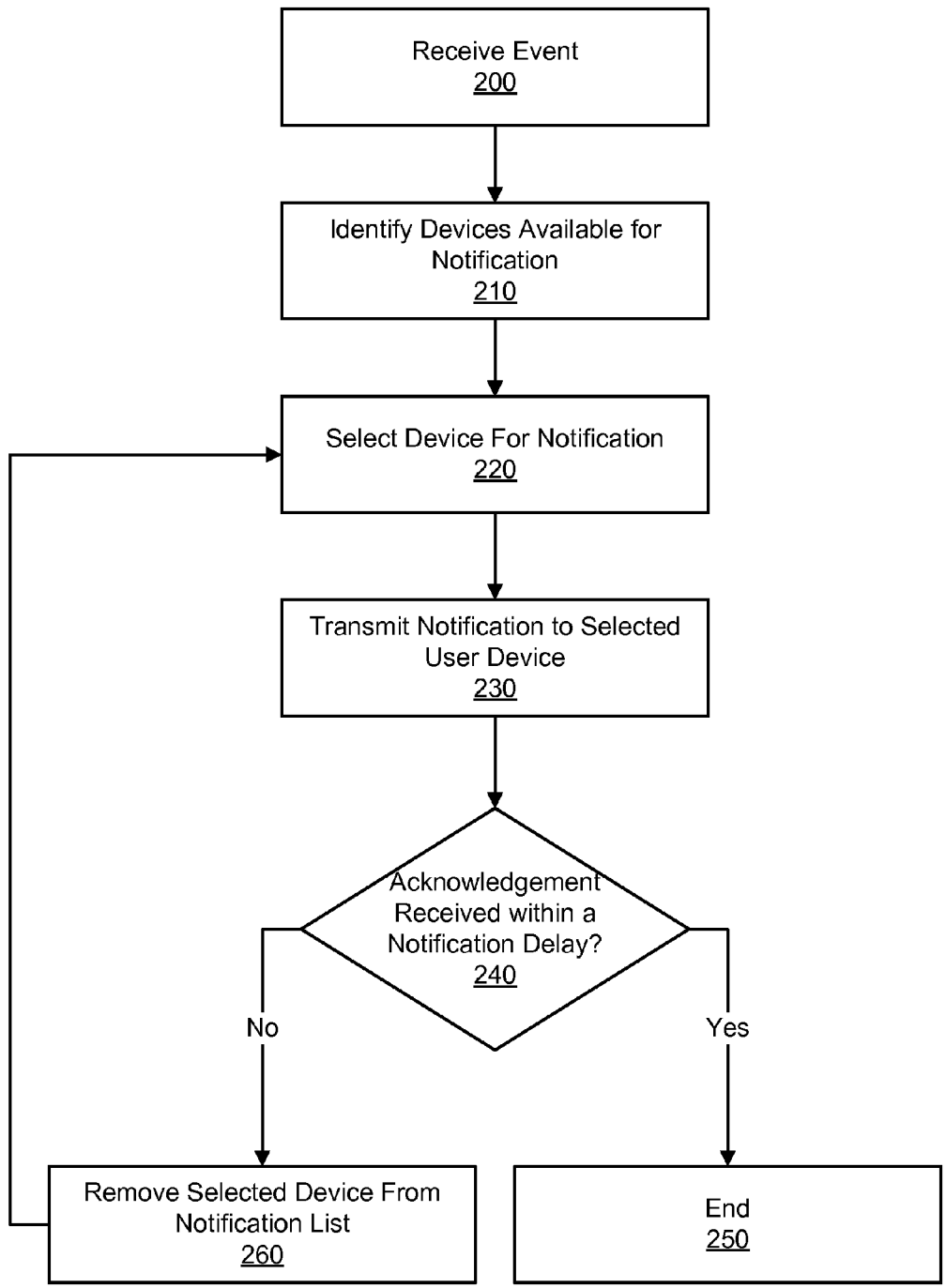
FIG. 2 is a flowchart of a method for sending notifications to a user associated with multiple user devices according to one embodiment.

FIG. 2 is a flowchart of one embodiment of a method for sending notifications to a user associated with multiple user devices 110. The notification module 106 of the notification system 100 receives 200 an event from the event module 102. The received event identifies a user to receive a notification of the event. In another embodiment, the notification module 106 determines whether to notify a user associated with the event of the event based on preferences associated with the user and an event type associated with the event.

User devices 110 associated with the user and eligible to receive notifications are identified 210. The identified devices are the user devices 110 specified by the user as available to receive notifications. For example, the user devices 110 are associated with an account for the user maintained by the notification system 100. A user device 110 is selected 220 from the identified devices associated with the user and eligible to receive a notification. The user device 110 is selected 220 based on user interactions associated with various user devices 110, as further described above in conjunction with FIG. 1. In one embodiment, if the user has communicated with the notification system 100 within an idle time threshold, the user device 110 from which a most recent communication from the user was received is selected 220. If the user has not communicated with the notification system 100 within the idle time threshold, a user device 110 from which the user is most likely to acknowledge the notification is selected from the user profile is selected using one or more parameters such as the time of day. In one embodiment, more than one user device 110 is selected for notification. After selecting 220 the user device 110, the notification is transmitted 230 to the selected user device.

After transmitting 230 the notification to the selected user device 110, the notification system 100 waits to receive an acknowledgment for an acknowledgement delay period and determines 240 whether an acknowledgment is received within an acknowledgment delay period. The acknowledgment may be received from any user device 110 to which the notification was previously transmitted 230. If the notification system 100 determines 240 an acknowledgment was received from a user device previously receiving the notification within the acknowledgment delay period, the notification process ends 250. If the notification system 100 determine 240 an acknowledgment was not received within the acknowledgment delay period, the selected device is removed 260 from the user devices 110 eligible to receive the notification and an additional user device 110 is selected 220 to receive the notification and the notification is transmitted 230 to the additional user device.

In one embodiment, an acknowledgement delay period is determined for different notifications. Various factors may modify the acknowledgment delay period for different notifications. For example, the acknowledgement delay period may increase as the number of user devices 110 to which notifications are transmitted 230 increases. As another example, the acknowledgment delay period is determined based on characteristics of different user devices 110. User interactions received by the notification system 100 from different user devices 110 are stored and used to determine an average time to receive acknowledgments to notifications from different user devices 110. The acknowledgment delay period for a user device 110 may be selected as the average time to respond to a notification presented by the user device 110 or as a time corresponding to one or more standard deviations from the average response time.

Alternatively, the acknowledgment delay period associated with a user device 110 is selected to encompass a percentile of acknowledgments received from a user device 110. For example, an acknowledgement delay period is set so that 80% of the acknowledgements from the user device 110 were received within the acknowledgement delay period. Alternatively, the user acknowledgment times may be analyzed to determine a drop-off point in user response times. For example, the user may acknowledge within 3 minutes of a user device 110 receiving a notification 90% of the time, while the acknowledgement time becomes variable after 3 minutes, making 3 minutes is a drop-off point in the user acknowledgment time for the user device 110.

Figure 3:
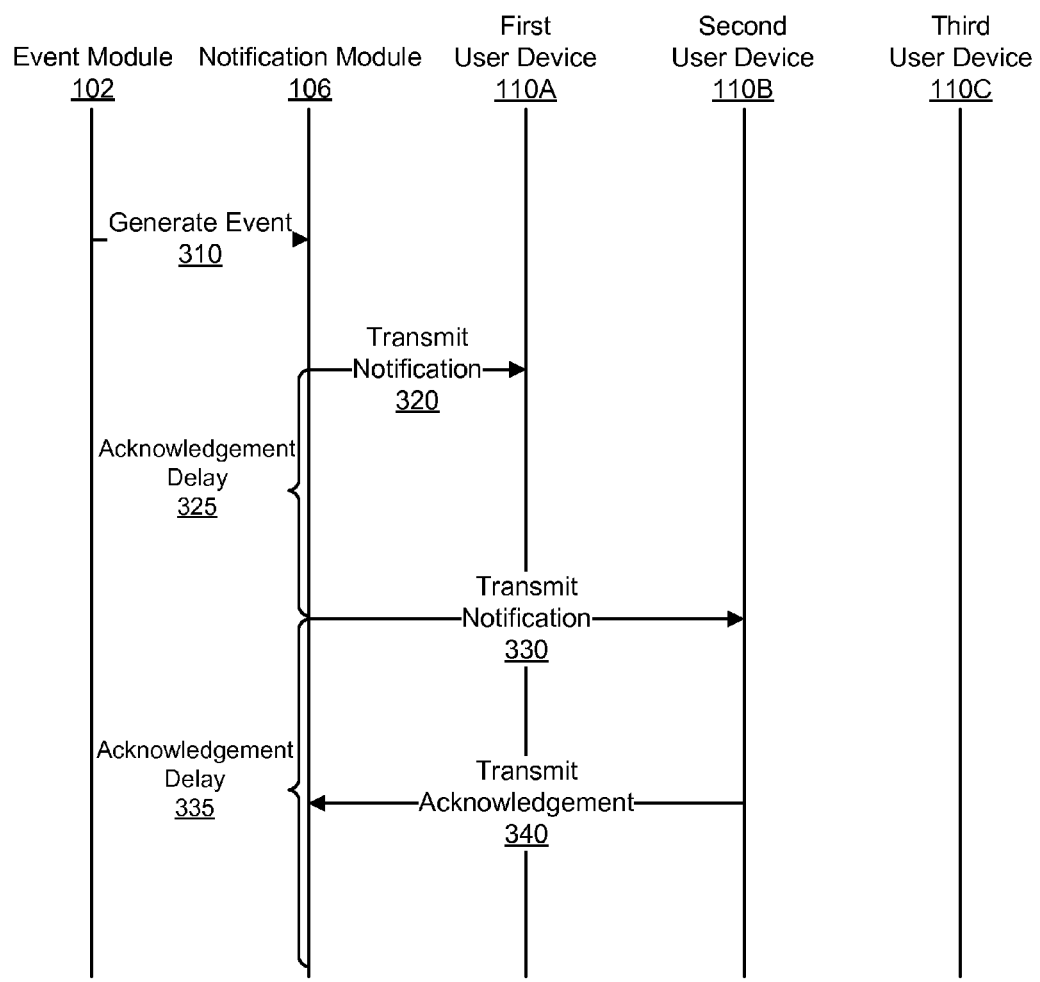
FIG. 3 is an interaction diagram of a method for sending notifications to user devices associated with a user according to one embodiment.

FIG. 3 is interaction diagram of one embodiment of a method for transmitting notifications to user devices associated with a user. The example of FIG. 3 depicts the event module 102, the notification module 106, and three user devices 110A, 110B, 110C associated with a user of the notifications system 110. The event module 102 generates 310 an event and provides the event to the notification module 106. The notification module 106 identifies the user devices 110A, 110B, 110C associated with the user and selects one of the user devices 110A, 110B, 110C to receive the notification. In the example of FIG. 3, the notification module 106 selects the first user device 110A and transmits 320 the notification to the first user device 110A.

After transmitting 320 the notification, the notification module waits for an acknowledgment delay period 325 to receive an acknowledgement of the notification from the first user device 110A. In FIG. 3, the first user device 110A does not transmit an acknowledgement of the notification within the acknowledgement delay period 325. Accordingly, the notification module 106 selects the second user device 110B and transmits 330 the notification to the second user device 110B. After transmitting the notification to the second user device 110B, the notification module 106 waits for a second acknowledgment delay period 335. In the example of FIG. 3, the second acknowledgement delay period 335 has a different length than the acknowledgement delay period 325.

The second user device 110B transmits 340 an acknowledgment to the notification module 106 within the second acknowledgment delay period 335. The acknowledgement indicates the user received the notification using the second user device 110B. In FIG. 3, although the third user device 110C is associated with the user and eligible to receive a notification, it is not notified because the notification module 106 receives the acknowledgement from the second user device 110B within the second acknowledgement delay period 335. Hence, the notification is not transmitted to the third user device 110C, preventing the user from viewing and clearing the notification from the third user device 110C. In embodiments where notifications may be cleared, a message is also sent to the first user device to clear the notification for the user. In this way, once the user has interacted with the notification at one user device (here, the second user device), the notification is not transmitted to additional user devices and notifications previously transmitted to other user device 110 are removed.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating a notification associated with a user;
   identifying a plurality of user devices eligible to receive the notification, each user device associated with the user and configured to provide an acknowledgment responsive to the user interacting with the notification;
   selecting a user device from the plurality of user devices based at least in part on a profile comprising a frequency with which user interactions are received from user devices in the plurality of user devices;
   transmitting the notification to the selected user device;
   identifying a set of acknowledgment times received from the selected user device for previous messages sent to the selected user device;
   determining, for the selected user device, a percentile of the acknowledgment times based on a drop-off point in the distribution of the set of acknowledgment times of the selected user device;
   determining a percentile acknowledgement time corresponding to the determined percentile of the acknowledgment times;
   determining an acknowledgment delay period based on the percentile acknowledgement time;
   responsive to an acknowledgment not being received within the acknowledgement delay period:
   selecting an additional user device based at least in part on the profile;
   removing the selected user device from the plurality of user devices eligible to receive the notification; and
   transmitting the notification to the selected additional user device.

2. The computer-implemented method of claim 1, wherein selecting the additional user device comprises:
   determining an additional acknowledgment delay period associated with the additional user device.

3. The computer-implemented method of claim 2, further comprising:
   selecting another user device from the plurality of user devices if an acknowledgement is not received from the selected additional user device within the additional acknowledgment delay period.

4. The computer-implemented method of claim 1, wherein the selected user device is a user device from which an interaction was most recently received.

5. The computer-implemented method of claim 1, wherein the selected user device is a user device having a highest frequency with which user interactions are received.

6. The computer-implemented method of claim 1, wherein the frequency with which user interactions are received is relative to a time of day.

7. A computer-implemented method comprising:
   generating a notification identifying a user;
   selecting a user device associated with the user based at least in part on a profile comprising a frequency with which user interactions are received from user devices in the plurality of user devices;
   transmitting the notification to the user device, the user device configured to provide an acknowledgment of the notification responsive to the user interacting with the notification;
   identifying a set of acknowledgment times received from the selected user device for previous messages sent to the selected user device;
   determining, for the selected user device, a percentile of the acknowledgment times based on a drop-off point in the distribution of the set of acknowledgment times of the selected user device;
   determining a percentile acknowledgement time corresponding to the determined percentile of the acknowledgment times;
   determining an acknowledgment delay period based on the percentile acknowledgement time;
   determining whether the acknowledgment is received from the user device within the acknowledgement delay period; and
   responsive to determining acknowledgment was not received from the user device within the acknowledgment delay period, transmitting the notification to an additional user device from the plurality of user devices associated with the user based at least in part on the profile.

8. The computer-implemented method of claim 7, wherein the user device is a user device having a highest frequency with which user interactions are received.

9. The computer-implemented method of claim 7, wherein the frequency with which interactions are received is relative to a time of day.

10. The computer-implemented method of claim 7, further comprising:
    responsive to determining acknowledgment was not received from the additional user device within the acknowledgment delay period, transmitting the notification to an alternative user device from the plurality of user devices associated with the user.

11. The computer-implemented method of claim 10, further comprising:
    responsive to receiving an acknowledgment of the notification from the alternative user device, removing the notification transmitted to the user device and transmitted to the additional user device.

12. The computer-implemented method of claim 7, wherein the acknowledgment delay period is based on user activity associated with the user device.

13. A non-transitory computer-readable storage medium storing instructions that, when executed by a processor, causes the processor to perform steps of:

generating a notification associated with a user;
identifying a plurality of user devices eligible to receive the notification, each user device associated with the user and configured to provide an acknowledgment responsive to the user interacting with the notification;
selecting a user device from the plurality of user devices based at least in part on a profile comprising a frequency with which user interactions are received from user devices in the plurality of user devices;
transmitting the notification to the selected user device;
identifying a set of acknowledgment times received from the selected user device for previous messages sent to the selected user device;
determining, for the selected user device, a percentile of the acknowledgment times based on a drop-off point in the distribution of the set of acknowledgment times of the selected user device;
determining a percentile acknowledgement time corresponding to the determined percentile of the acknowledgment times;
determining an acknowledgment delay period based on the percentile acknowledgement time; and
responsive to an acknowledgment not being received within an acknowledgement delay period:
selecting an additional user device based at least in part on the profile;
removing the selected user device from the plurality of user devices eligible to receive the notification; and
transmitting the notification to the selected additional user device.

14. The non-transitory computer-readable storage medium of claim 13, wherein the step of selecting the additional user device further comprises:
determining an additional acknowledgment delay period associated with the additional user device.

15. The non-transitory computer-readable storage medium of claim 14, wherein the steps further include:
selecting another user device from the plurality of user devices if an acknowledgement is not received from the selected additional user device within the additional acknowledgment delay period.

16. The non-transitory computer-readable storage medium of claim 13, wherein the acknowledgment delay period is based on user activity associated with the selected user device.

17. The non-transitory computer-readable storage medium of claim 13, wherein the selected user device is a user device from which an interaction was most recently received.

18. The non-transitory computer-readable storage medium of claim 13, wherein the selected user device is a user device having a highest frequency with which user interactions are received.

19. The non-transitory computer-readable storage medium of claim 13, wherein the frequency with which user interactions are received is relative to a time of day.

20. A system comprising;
a processor configured to execute instructions; and
a memory storing instructions that when executed by the processor cause the processor to perform steps including:
generating a notification associated with a user;
identifying a plurality of user devices eligible to receive the notification, each user device associated with the user and configured to provide an acknowledgment responsive to the user interacting with the notification;
selecting a user device from the plurality of user devices based at least in part on a profile comprising a frequency with which user interactions are received from user devices in the plurality of user devices;
transmitting the notification to the selected user device;
identifying a set of acknowledgment times received from the selected user device for previous messages sent to the selected user device;
determining, for the selected user device, a percentile of the acknowledgment times based on a drop-off point in the distribution of the set of acknowledgment times of the selected user device;
determining a percentile acknowledgement time corresponding to the determined percentile of the acknowledgment times;
determining an acknowledgment delay period based on the percentile acknowledgement time; and
responsive to an acknowledgment not being received within an acknowledgement delay period:
selecting an additional user device based at least in part on the profile;
removing the selected user device from the plurality of user devices eligible to receive the notification; and
transmitting the notification to the selected additional user device.

21. The system of claim 20, wherein the step of selecting the additional user device further comprises:
determining an additional acknowledgment delay period associated with the additional user device.

22. The system of claim 20, wherein the steps further include:
selecting another user device from the plurality of user devices if an acknowledgement is not received from the selected additional user device within the additional acknowledgment delay period.

23. The system of claim 20, wherein the acknowledgment delay period is based on user activity associated with the selected user device.

24. The system of claim 20, wherein the selected user device is a user device from which an interaction was most recently received.

25. The system of claim 20, wherein the selected user device is a user device having a highest frequency with which user interactions are received.

26. The system of claim 20, wherein the frequency with which user interactions are received is relative to a time of day.

* * * * *